United States Patent
Nedez

(10) Patent No.: US 7,022,161 B2
(45) Date of Patent: Apr. 4, 2006

(54) PROCESS USING ALUMINA AGGLOMERATES TO ELIMINATE ORGANIC OXYGEN-CONTAINING MOLECULES PRESENT IN AN ORGANIC EFFLUENT

(75) Inventor: Christophe Nedez, Salindres (FR)

(73) Assignee: Axens, Rueil Malmaison (FR)

( * ) Notice: Subject to any disclaimer, the term of this patent is extended or adjusted under 35 U.S.C. 154(b) by 6 days.

(21) Appl. No.: 10/473,932

(22) PCT Filed: Mar. 27, 2002

(86) PCT No.: PCT/FR02/01069

§ 371 (c)(1),
(2), (4) Date: Mar. 15, 2004

(87) PCT Pub. No.: WO02/081047

PCT Pub. Date: Oct. 17, 2002

(65) Prior Publication Data

US 2004/0134350 A1  Jul. 15, 2004

(30) Foreign Application Priority Data

Apr. 4, 2001  (FR) .................. 01 04588

(51) Int. Cl.
*B01D 53/04* (2006.01)
(52) U.S. Cl. .............. 95/141; 95/143; 95/148; 95/900
(58) Field of Classification Search .......... 95/99, 95/106, 115, 123, 126, 141, 143–148, 900
See application file for complete search history.

(56) References Cited

U.S. PATENT DOCUMENTS

| | | | |
|---|---|---|---|
| 3,594,982 A * | 7/1971 | Pearson ................. 95/126 |
| 3,890,120 A | 6/1975 | Guyot et al. |
| 4,755,499 A * | 7/1988 | Neal et al. ................. 502/415 |
| 4,798,711 A * | 1/1989 | Neal et al. ................. 423/239.1 |
| 4,940,569 A * | 7/1990 | Neal et al. ................. 423/239.1 |
| 5,427,689 A | 6/1995 | Kallenbach et al. |
| 5,779,767 A * | 7/1998 | Golden et al. ................. 95/96 |
| 5,856,265 A * | 1/1999 | Kanazirev ................. 502/415 |
| 5,917,136 A * | 6/1999 | Gaffney et al. ................. 95/98 |
| 6,159,898 A | 12/2000 | Kanazirev |
| 6,379,430 B1 * | 4/2002 | Monereau ................. 95/96 |
| 6,402,814 B1 * | 6/2002 | Kraus et al. ................. 95/106 |
| 6,413,434 B1 | 7/2002 | Nedez |
| 6,461,411 B1 * | 10/2002 | Watanabe et al. ................. 95/116 |
| 6,508,862 B1 * | 1/2003 | Tonkovich et al. ................. 95/106 |
| 6,599,347 B1 * | 7/2003 | Kalbassi et al. ................. 95/10 |

FOREIGN PATENT DOCUMENTS

DE   198 43 241 A1   3/2000
WO   WO 86/02285    4/1986

OTHER PUBLICATIONS

Abstract—XP-002-188-494—High active, regenerateable alumina prodn.-for removing contaminants from feed stream, involves heating in nitrogen stream to remove surface water—Derwent Section Ch, Week 198843- Date —1988.
International Search Report PCT/US85/01960—Date of Completion Dec. 12, 1985.

* cited by examiner

*Primary Examiner*—Robert H. Spitzer
(74) *Attorney, Agent, or Firm*—Welsh & Katz, Ltd.

(57) ABSTRACT

A process for eliminating organic oxygen-containing molecules such as alcohols and organic present in an organic or gaseous effluent is characterized in that the elimination is carried out by adsorbing said organic oxygen-containing molecules onto alumina agglomerates.

17 Claims, No Drawings

PROCESS USING ALUMINA AGGLOMERATES TO ELIMINATE ORGANIC OXYGEN-CONTAINING MOLECULES PRESENT IN AN ORGANIC EFFLUENT

The invention relates to the field of eliminating impurities contained in organic industrial effluents in the liquid or gas state. More precisely, it relates to eliminating oxygen-containing impurities by adsorption onto alumina agglomerates.

Many gaseous or liquid industrial effluents contain impurities which should be eliminated. However, such impurities can cause environmental problems, for example. More broadly, keeping the impurities in the effluent can cause problems as regards quality (coloring the effluent, for example) or can have a negative influence on downstream transformation (destroying a catalyst required for a chemical reaction, or side reactions resulting in a drop in selectivity). Impurities encountered in industry that should be eliminated include alcohols and organic acids and, in general, organic oxygen-containing molecules.

Impurities can be eliminated from a liquid industrial effluent by distillation. The costs of such an operation are often high, and further, such a method cannot overcome all of the technical problems that arise, for example degradation of the essential components of the effluent which can be caused by a rise in temperature. Further, the impurities are often present in only trace amounts (less than 1%), rendering the use of distillation disproportionate. Finally, the distillation temperatures of the different constituents of the effluent and of the impurities are not always sufficiently different to enable such a method to be used.

In certain specific cases, the impurities can be eliminated by washing with a suitable solvent. That solution, however, is not always suitable and in any case, treating the used solvent is a problem that is becoming increasingly difficult.

Consequently, using a solid adsorbent can often constitute a pertinent solution to the problem. That technical solution can be used with an effluent to be purified which is in a liquid or gas form.

To this end, it is known to use alumina agglomerates as a solid adsorbent, in particular to eliminate impurities constituted by oxygen-containing organic compounds such as alcohols and organic acids present in an organic effluent.

The aim of the invention is to provide users with a process exhibiting optimum performance to eliminate the oxygen-containing organic impurities comprised in an organic effluent.

To this end, the invention provides a process for eliminating organic oxygen-containing molecules, such as alcohols or organic acids, present in an organic or gaseous effluent, the process being characterized in that said elimination is carried out by adsorbing said organic oxygen-containing molecules onto alumina agglomerates with the following characteristics:

- a specific surface area of 10 square meters per gram ($m^2/g$) or more, preferably 30 $m^2/g$ or more;
- optionally containing one or more doping compounds selected from alkali metal compounds, alkaline-earth metal compounds and rare earth compounds with a total content by weight of said elements of 50% or less, preferably 25% or less, more preferably in the range 5000 parts per million (ppm) to 20%, still more preferably in the range 5000 ppm to 12%;
- if their doping compound content is 5000 ppm or more, their total pore volume is 30 milliliters per hundred grams (ml/100 g) or more, more preferably 35 ml/100 g or more, and their $V_{70}$ Å is 10 ml/100 g or more, preferably 15 ml/100 g or more, still more preferably 22 ml/100 g or more, yet more preferably 28 ml/100 g or more, and optimally 35 ml/100 g or more;
- if their doping compound content is below 5000 ppm, their total pore volume is 45 ml/100 g or more, preferably 50 ml/100 g or more, more preferably 55 ml/100 g or more, and their $V_{70}$ Å is 15 ml/100 g or more, preferably 22 ml/100 or more, more preferably 28 ml/100 g, and optimally 35 ml/100 g or more.

Said doping compounds are preferably selected from compounds based on sodium, potassium, calcium, magnesium, and lanthanum.

Said alumina agglomerates may comprise a sodium compound as the sole compound.

Said alumina agglomerates may be in the form of beads.

The diameter of said beads may be in the range 0.5 millimeters (mm) to 10 mm, preferably in the range 0.7 mm to 8 mm, more preferably in the range 0.8 mm to 5 mm.

The alumina agglomerates may also be in the form of extruded materials.

They may be in the range 0.5 mm to 5 mm in size, preferably in the range 0.7 mm to 3 mm.

Said organic effluent may be a hydrocarbon or a mixture of hydrocarbons.

Said elimination may be carried out at ambient temperature.

The alumina agglomerates are regenerated, preferably periodically, by treatment in a stream of hot gas.

Said hot gas may be an inert gas the temperature of which may be at least 130° C., preferably at least 200° C., more preferably at least 230° C.

Said hot gas may be an oxidizing gas mixture or gas the temperature of which is at least 150° C. preferably at least 200° C.

Said oxidizing gas mixture or gas is preferably selected from air, another oxygen/nitrogen mixture and a mixture containing steam.

To regenerate the alumina agglomerates, it is possible to employ a plurality of hot gases in succession, each of said hot gases being one of the types cited above.

As will be seen, the invention consists of endowing alumina agglomerates used during an operation for adsorbing oxygen-containing organic compounds from an organic effluent with a particular morphology in the combined terms of specific surface area, total pore volume and volume represented by pores with a diameter of 70 Angstroms (Å) or more. The inventors have established that such agglomerates are remarkably suitable for adsorbing oxygen-containing organic compounds.

The efficacy of aluminas for the envisaged application can be further strengthened if "doping" products constituted by compounds based on alkali metals or alkaline-earth metals or rare earths are added. These dopants render it possible to obtain the desired results with lower porosities for these aluminas.

The total pore volume (TPV) and the volume represented by pores with a diameter of 70 Å or more ($V_{70}$ Å) can be measured for an alumina sample using a conventional mercury porisimetric method.

To this end, the alumina sample is placed in a column into which mercury is introduced at a pressure P. Mercury does not wet alumina, and so its penetration or otherwise into pores with a given diameter in a sample is a function of the value of P. Finer pores require a higher pressure to fill them than coarser pores. Measuring the quantity of mercury penetrating into the sample at different values of P allows the volume occupied by pores with a diameter that is higher than the values given for that diameter to be determined. Applying the highest possible pressure P produces the TPV.

The alumina can be in any conventional form: powder, beads, extruded materials, crushed material, or monoliths. Beads and extrudates are preferred. The size of the beads will then usefully be in the range 0.5 mm to 10 mm, preferably between 0.7 mm and 8 mm, and more preferably between 0.8 mm and 5 mm. The extrudates can be cylindrical or polylobed in shape, and solid or hollow; they are usefully in the range 0.5 mm to 5 mm in size, preferably in the range 0.7 mm to 3 mm.

Alumina agglomerates with a standard composition can be employed for the envisaged use, prepared and formed using any known method for producing the desired porosity characteristics. By way of example, the beads can be obtained using a rotary apparatus, by agglomerating an alumina powder in a bowl granulator or a drum. As is well known, that type of method produces beads with a controlled diameter and pore distribution, said dimensions and distributions generally being produced during the agglomeration step. The porosity can be produced by different means, such as the choice of the granulometry of the alumina powder or agglomerating a plurality of alumina powders with different granulometries. A further method consists of mixing a compound known as a pore-forming agent with the alumina powder before or during the agglomeration step, which pore-forming agent disappears on heating and thus creates the porosity in the beads. Examples of pore-forming agents that can be cited are wood flour, wood charcoal, sulfur, tars, plastics materials or emulsions of plastics materials such as polyvinyl chloride, polyvinyl alcohols, naphthalene, or the like. The quantity of pore-forming agents added is determined by the desired volume. One or more heat treatments can then finish bead formation. The extrudates can be obtained by mixing and then extruding an alumina gel or an alumina powder or a mixture of different starting materials.

The initial alumina powder can be obtained by rapidly dehydrating an aluminum hydroxide or oxyhydroxide (for example hydrargillite).

The porosity characteristics demanded by the invention when the alumina agglomerates have a standard composition are as follows:
- a specific surface area of 10 $m^2/g$ or more, preferably 30 $m^2/g$ or more;
- a TPV of 45 ml/100 g or more, preferably 50 ml/100 g or more, more preferably 55 ml/100 g or more;
- a $V_{70}$ Å of more than 15 ml/100 g, preferably 22 ml/100 g or more, more preferably 28 ml/100 g or more, optimally 35 ml/100 g or more.

However, the best results are obtained when instead of alumina agglomerates with a standard composition, alumina agglomerates are used into which one or more "doping" components constituted by alkali metal compounds, alkaline-earth metal compounds or rare earth compounds have been incorporated. Preferably, compounds based on sodium, potassium, calcium, magnesium or lanthanum are selected. Sodium is a preferred example, which can be introduced in the form of one or more precursors of its oxide $Na_2O$.

Doping compounds can be added before or after the forming operation, or during it.

The doping compounds are present in the alumina agglomerate as a total mass content of less than 50%, preferably less than 25%, advantageously in the range 5000 ppm to 20%, and optimally in the range 5000 ppm to 12%.

Too high a doping compound content substantially reduces the alumina content and therefore the surface area of the adsorbent.

These doping compounds can accentuate the adsorbent properties of the surface of the alumina agglomerates as regards the oxygen-containing organic molecules to be eliminated. Their use in an amount of more than 5000 ppm can, for the same result, reduce the requirements imposed on agglomerate porosity. The specific surface area required remains 10 $m^2/g$ or more, or even 30 $m^2/g$ or more, but the minimum TPV can be reduced to 20 ml/100 g, preferably 30 ml/100 g, more preferably 35 ml/100 g. The minimum $V_{70}$ Å can be reduced to 10 ml/100 g. Preferably, it is 15 ml/100 g or more, more preferably 22 ml/100 g or more, still more preferably 28 ml/100 g or more, and optimally 35 ml/100 g or more.

The invention has particular application to purifying a liquid or gaseous organic effluent constituted by a hydrocarbon or a mixture of hydrocarbons, which may be saturated or unsaturated, aliphatic and/or aromatic, and wherein the amount of organic oxygen-containing compounds such as alcohols and organic acids is to be reduced. The operation is particularly effective with a liquid effluent.

The alcohol or alcohols to be eliminated have general formula R—OH in which R contains at least one carbon atom (thus excluding water from this application). It may be a compound comprising multiple alcohol functions (in particular diols or triols) even if the monoalcohols are a preferred target for alcohol elimination. The invention also encompasses phenolic compounds.

The organic acid or acids to be eliminated have general formula R—COOH, R being a hydrogen atom or a radical containing at least one carbon atom. Such compounds can comprise more than one acid function (dibasic or tribasic acids, for example).

The adsorption operation can usually be carried out at ambient temperature or at a temperature close to ambient temperature, for example in the range 0° C. to 60° C., but this condition is in no way obligatory in the general case.

It is advisable to carry out a periodic regeneration of the alumina employed, to prolong its service life.

Such a regeneration treatment can be carried out by passing a stream of a hot inert gas over the agglomerate (nitrogen or argon, for example) at about 130° C., for example, if the impurities eliminated are essentially aliphatic alcohols. A temperature of less than 130° C. is acceptable if the treatment can be prolonged as a result.

When the impurities are essentially aromatic alcohols and/or organic acids, it is preferable to heat the gas stream to 200° C. or more, or even to at least 230° C.

It is also possible to use a gas or a mixture of an oxidizing gas (such as air, a different nitrogen/oxygen mixture, or a mixture containing steam) heated to at least 150° C., or even to at least 200° C.

These treatments can be used in combination.

Examples of alumina agglomerates in accordance with the invention and of comparative examples are given below, as well as the results of experiments demonstrating the adsorbent capacities of these various alumina agglomerates towards alcohols and organic acids mixed with a hydrocarbon.

The compositions and morphologies of the agglomerates used are shown in Table 1.

TABLE 1

Composition and morphology of alumina agglomerates used in experiments

| | references | | Invention | | | | |
|---|---|---|---|---|---|---|---|
| alumina | 1 | 2 | 3 | 4 | 5 | 6 | 7 |
| form | beads | beads | beads | beads | extrudates | beads | beads |
| diameter (mm) | 1.4–2.8 | 2–4 | 1.4–2.8 | 2.4–4 | 1.2 | 1.4–2.8 | 2.4–4 |
| surface area (m$^2$/g) | 328 | 8 | 252 | 192 | 255 | 139 | 181 |
| TPV (ml/100 g) | 43 | 52 | 40 | 71 | 56 | 114 | 65 |
| V$_{70Å}$ (ml/100 g) | 15 | 52 | 14 | 62 | 43 | 113 | 56 |
| Na$_2$O (ppm) | 3400 | 600 | 20000 | 600 | 600 | 500 | 10500 |

Agglomerates 1 and 2 are comparative examples that are not relevant to the invention. Agglomerate 1 has an Na$_2$O content of less than 5000 ppm which was obtained naturally during its preparation. It has a large specific surface area but a TPV that is slightly lower than the required lower limit, and a V$_{70}$ Å that is just on the minimum limit required. Agglomerate 2 has a low specific surface area that is below the required minimum, but a relatively high TPV and V$_{70}$ Å. Its Na$_2$O content was reduced during treatments that were carried out during its manufacture.

Agglomerates 3, 4 and 5 are in accordance with the invention. They all have a high specific surface area (somewhat lower than that for reference agglomerate 1).

Agglomerates 4 and 5 have a high TPV and V$_{70}$ Å; the Na$_2$O content of agglomerate 4 was reduced in an identical manner to that for reference agglomerate 2. The Na$_2$O content of agglomerate 5 is due to that of the starting material used, which corresponds to a boehmite gel.

Agglomerate 3 has a low TPV and V$_{70}$ Å (even lower than those for reference agglomerate 1) but its Na$_2$O content was deliberately increased to 2%. To this end, dry impregnation was carried out using a dilute sodium hydroxide solution on previously produced beads. After drying at 100° C. for 2 hours, calcining was carried out for 2 hours at 400° C.

Adsorption of the following compounds mixed with cyclohexane by these agglomerates was studied:

alcohols: tertioamyl alcohol, methanol, pentanol, phenol, 4-tertiobutylphenol, 2-tertiobutylphenol, carvacrol and 1,2-propanediol;

organic acids: acetic acid, n-benzoic acid, 2,2-dimethylbutanoic acid, benzoic acid.

The tests were carried out as follows: a mixture constituted by 250 ml of cyclohexane and 1000 ppm or an alcohol or 500 volumes per million (vpm) of an organic acid was placed in a beaker. A sample of 0.5 g of alumina (for the alcohols and benzoic acid) or 0.2 g of alumina (for the other organic acids) pre-treated in nitrogen for 2 hours at 300° C. was placed in the beaker, in a boat isolating the beads or extrudates from the stirring bar for the mixutre. A glass stopper closed the beaker to prevent the moisture in the system from being altered. The adsorption progress was followed by injecting samples from the mixture into a gas chromatograph.

The adsorption results are summarized in Tables 2 to 6 below; they are expressed as the gain in weight of the alumina, considered after pre-treatment, due to adsorption of an alcohol or organic acid.

TABLE 2

Adsorption of alcohol after 2 hours of reaction

| alcohol | alumina | weight gain (g/100 g) |
|---|---|---|
| 1000 ppm tertioamyl alcohol | 1 | 5.5 |
| | 2 | 0.6 |
| | 3 | 12.6 |
| | 5 | 10.7 |
| | 6 | 14.1 |
| 1000 ppm 1-pentanol | 1 | 1.8 |
| | 5 | 3.1 |

TABLE 3

Adsorption of alcohol after 18 hours of reaction

| alcohol | alumina | weight gain (g/100 g) |
|---|---|---|
| 1000 ppm phenol | 1 | 9.6 |
| | 2 | 0.8 |
| | 5 | 12.3 |
| 1000 ppm 4-tBu phenol | 1 | 6.2 |
| | 2 | 6.9 |
| | 4 | 8.1 |
| | 5 | 11.0 |
| | 6 | 10.5 |
| | 7 | 8.7 |
| 1000 ppm 2-tBu-phenol | 1 | 5.9 |
| | 5 | 7.0 |
| 1000 ppm carvacrol | 1 | 4.2 |
| | 5 | 10.3 |
| 1000 ppm 1,2-propanediol | 2 | 0.5 |
| | 4 | 8.6 |

TABLE 4

Adsorption of alcohol after 320 hours of reaction

| alcohol | alumina | weight gain (g/100 g) |
|---|---|---|
| 1000 ppm tertioamyl alcohol | 1 | 23.9 |
| | 2 | 1.6 |
| | 4 | 29.8 |
| | 5 | 33.5 |

TABLE 5

Adsorption of organic acid after 20 hours of reaction

| organic acid | alumina | weight gain (g/100 g) |
| --- | --- | --- |
| 500 vpm acetic acid | 1 | 7.9 |
| | 2 | 0.3 |
| | 3 | 9.5 |
| | 5 | 12.5 |
| 500 vpm n-hexanoic acid | 1 | 1.9 |
| | 2 | 0.2 |
| | 3 | 2.5 |
| | 4 | 3.2 |
| | 5 | 5.3 |
| 500 vpm 2,2-dimethylbutanoic acid | 1 | 2.7 |
| | 2 | 0.3 |
| | 3 | 3.6 |
| | 4 | 7.3 |
| | 5 | 10.5 |
| | 6 | 10.1 |
| | 7 | 7.9 |
| 500 vpm benzoic acid | 1 | 2.2 |
| | 2 | 0.2 |
| | 3 | 3.5 |
| | 4 | 10.3 |
| | 5 | 14.9 |
| | 6 | 13.8 |
| | 7 | 11.5 |

TABLE 6

Adsorption of acid after 44 hours of reaction

| organic acid | alumina | weight gain (g/100 g) |
| --- | --- | --- |
| 500 vpm 2,2-dimethylbutanoic acid | 1 | 3.3 |
| | 2 | 0.4 |
| | 3 | 5.1 |
| | 4 | 9.5 |
| | 5 | 13.7 |
| 500 vpm benzoic acid | 1 | 3.7 |
| | 2 | 0.3 |
| | 3 | 5.9 |
| | 4 | 12.0 |
| | 5 | 16.9 |
| | 6 | 15.5 |
| | 7 | 13.1 |

An analysis of these tests shows that the condition regarding a high specific surface area for the alumina agglomerate is indispensable, as sample 2 offers only mediocre adsorption results in all cases despite a high TPV and $V_{70}$ Å.

When aluminas 4, 5 and 6 in accordance with the invention, purified in $Na_2O$, are compared with reference alumina 1 which retains its normal $Na_2O$ content but has a low TPV and $V_{70}$ Å, the aluminas of the invention are systematically more advantageous.

Regarding alumina 3, which has a less advantageous TPV and $V_{70}$ Å than reference alumina 1, but which has been doped with $Na_2O$, it proves to be consistently superior to alumina 1 and when adsorbing tertioamyl alcohol, it is even superior to alumina 5. Alumina 7, doped with $Na_2O$ and with a TPV and $V_{70}$ Å within the preferred ranges, performs even better.

The invention claimed is:

1. A process for eliminating organic oxygen-containing molecules present in an organic or gaseous effluent, comprising: the steps of adsorbing said organic oxygen-containing molecules onto alumina agglomerates with the following characteristics:
   a specific surface area of 10 $m^2/g$ or more;
   a compound selected from the group consisting of alkali metal compounds, alkaline-earth metal compounds and rare earth compounds with a total content by weight of said compounds of 50% or less;
   having a total pore volume of 30 ml/100 g or more if a doping compound is 5000 ppm or more, and their $V_{70}$ Å is 10 ml/100 g or more, or having a total pore volume of 45 ml/100 g or more if the doping compound is below 5000 ppm.

2. A process according to claim 1, wherein said doping compound is selected from the group consisting of compounds based on sodium, potassium, calcium, magnesium and lanthanum.

3. A process according to claim 2, wherein said alumina agglomerates comprise a sodium compound.

4. A process according to claim 1, wherein said alumina agglomerates are in the form of beads.

5. A process according to claim 4, wherein the diameter of said beads is in the range 0.5 to 10 mm.

6. A process according to claim 1, wherein the alumina agglomerates are in the form of extruded materials.

7. A process according to claim 6, wherein the size of said extruded materials is in the range 0.5 mm to 5 mm.

8. A process according to claim 1, wherein said organic effluent is a hydrocarbon or a mixture of hydrocarbons.

9. A process according to claim 1, wherein said eliminating is carried out at ambient temperature.

10. A process according to claim 1, wherein the alumina agglomerates are periodically regenerated by treatment in a stream of hot gas.

11. A process according to claim 10, wherein said hot gas is an inert gas.

12. A process according to claim 11, wherein the temperature of said inert gas is at least 130° C.

13. A process according to claim 10, wherein said hot gas is an oxidizing gas mixture or gas the temperature of which is at least 150° C.

14. A process according to claim 13, wherein said oxidizing gas mixture or gas is selected from air, a further oxygen/nitrogen mixture and a mixture containing steam.

15. A process according to claim 10, wherein a plurality of hot gases are used in succession to regenerate the alumina agglomerates, said hot gases being inert.

16. The process of claim 1 wherein said compound is selected from the group consisting of alkali metal compounds, alkaline-earth metal compounds and rare earth compounds with a total content by weight of said compounds of 5000 ppm to 12%.

17. The process of claim 1, wherein said doping compounds, alkaline-earth metal compounds and rare earth compounds when their doping compound content is 35 ml/100 ppm or more, and the total pore volume is 35 ml/100 g or more, and their $V_{70}$ Å is 35 ml/100 g.

* * * * *